(12) United States Patent
Clarkson

(10) Patent No.: US 12,284,996 B1
(45) Date of Patent: Apr. 29, 2025

(54) TACKLE RETRIEVER

(71) Applicant: Christopher Haynes Clarkson, Howard, CO (US)

(72) Inventor: Christopher Haynes Clarkson, Howard, CO (US)

( * ) Notice: Subject to any disclaimer, the term of this patent is extended or adjusted under 35 U.S.C. 154(b) by 0 days.

(21) Appl. No.: 18/422,441

(22) Filed: Jan. 25, 2024

(51) Int. Cl.
*A01K 97/24* (2006.01)

(52) U.S. Cl.
CPC .................................. *A01K 97/24* (2013.01)

(58) Field of Classification Search
CPC .............................................. A01K 97/24
See application file for complete search history.

(56) References Cited

U.S. PATENT DOCUMENTS

| | | | | |
|---|---|---|---|---|
| 2,940,203 | A * | 6/1960 | Carter | A01K 97/24 43/17.2 |
| 8,539,711 | B2 * | 9/2013 | Leuckel | A01K 97/24 43/43.12 |
| 2016/0081320 | A1 * | 3/2016 | Olexson, Sr. | A01K 97/24 43/4.5 |
| 2023/0292726 | A1 * | 9/2023 | Bellamy | A01K 99/00 43/17.2 |

* cited by examiner

*Primary Examiner* — Richard G Davis
(74) *Attorney, Agent, or Firm* — Plager Schack LLP; Mark H. Plager, Esq.; Kara K. Verryt, Esq.

(57) ABSTRACT

A device for retrieving caught, stuck, or snagged fishing tackle may include a housing configured to mount to a handle; a blade assembly attached to the housing, the blade assembly comprise a head with a pair of curved arms; and a basket attached to and hanging from the housing, the basket including a handle configured to freely rotate within an orifice in the housing.

10 Claims, 5 Drawing Sheets

TACKLE RETRIEVER

BACKGROUND

The embodiments herein relate generally to fishing equipment, and more particularly, to a device for retrieving tackle that has become snagged and might otherwise be lost.

When fishing, tackle often gets snagged in trees, bushes, and the like, whether onshore or under water. It can be difficult to retrieve snagged tackle due to the height or difficult to access location, which often results in fishermen cutting or breaking the line, attempting to pull it free, and losing the tackle. This can also be a safety hazard with parts of the tackle flying back toward the fisherman.

Fishing tackle that becomes lost varies in size from tiny artificial flies with a single barbless hook to extremely large lures with multiple treble hooks. Other kinds of tackle that are frequently used are floats that contain very little metal or weights that have almost no magnetic component. Both can be tiny to extremely large depending on the fishing application. Snags take many different forms. Sometimes the line is twisted several times around the obstruction, and other times the hook becomes embedded in the obstruction.

There are existing tackle retriever devices, which generally fall into one or more of the following categories: (1) requires following the original fishing line to the snag; (2) frees the hook from the snag by manual manipulation; (3) has a fixed size opening with which to grab the tackle; (4) grabs the book; and (5) only works underwater. If all snags and fishing tackle were the same size and shape and had the same magnetic content, the existing retrieval systems would work all of the time, but in real life, every case is different. Many times, the fishing line is wound complexly around a branch, which requires cutting the branch to free the tackle. Other times, the hook is not accessible to be grabbed.

Therefore, what is needed is an improved tackle retrieving system that universally dislodges, catches, and recovers tackle so that it does not drop and become lost. This universality may be achieved by using a properly designed basket to catch fishing tackle once it has become free from the snag.

SUMMARY

Some embodiments of the present disclosure include a device for retrieving caught, stuck, or snagged fishing tackle. The device may include a housing configured to mount to a handle; a blade assembly attached to the housing, the blade assembly comprise a head with a pair of curved arms; and a basket attached to and hanging from the housing, the basket including a handle configured to freely rotate within an orifice in the housing.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a device for retrieving caught, stuck, or snagged tackle and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The elements of the device of the present disclosure may be related in the following exemplary fashion. It is not intended to limit the scope or nature of the relationships between the various elements and the following examples are presented as illustrative examples only.

By way of example, and referring to FIGS. 1-11, some embodiments of the present disclosure include a device for retrieving caught, stuck, or snagged tackle, such as a lure 54 attached to a line 56, the device comprising an elongate handle 46; a housing 26 attached to a distal end of the elongate handle 46; a blade assembly attached to the housing 26; and a basket 50 attached to and hanging from the housing 26.

Figure 1:
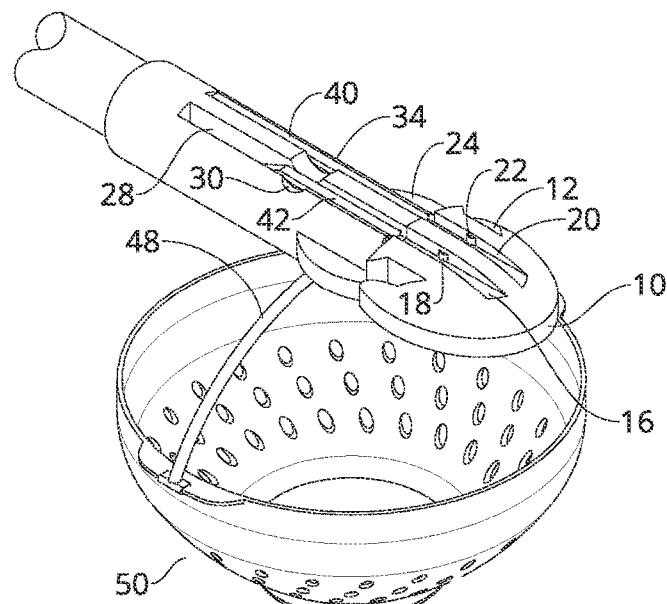
FIG. 1 is a perspective view of one embodiment of the present disclosure.
Figure 2:
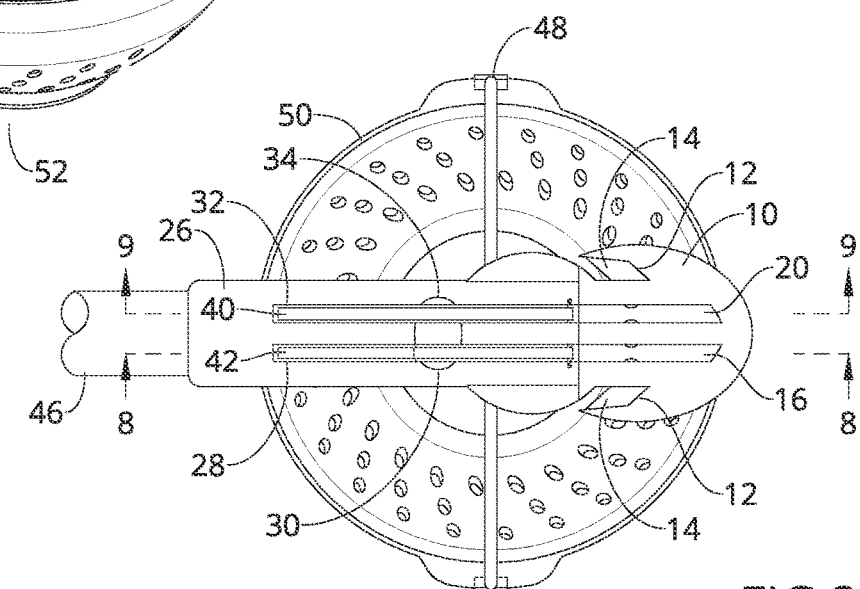
FIG. 2 is a top view of one embodiment of the present disclosure.
Figure 3:
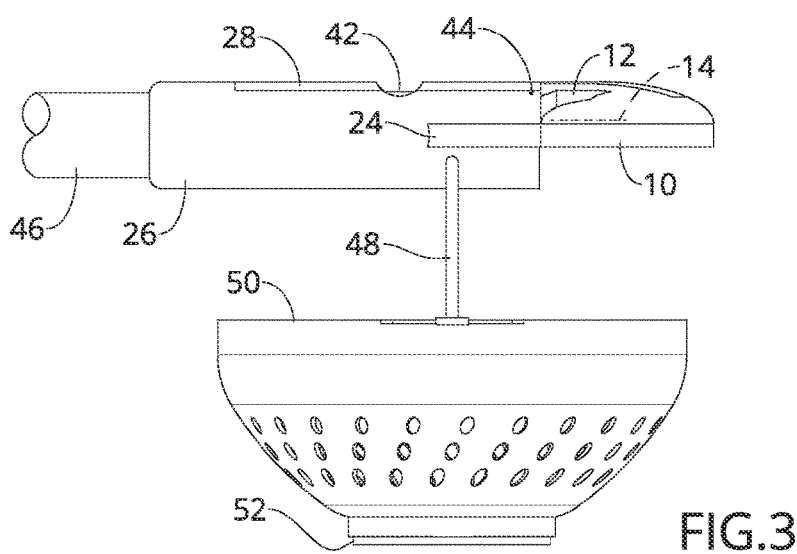
FIG. 3 is a side view of one embodiment of the present disclosure.
Figure 4:
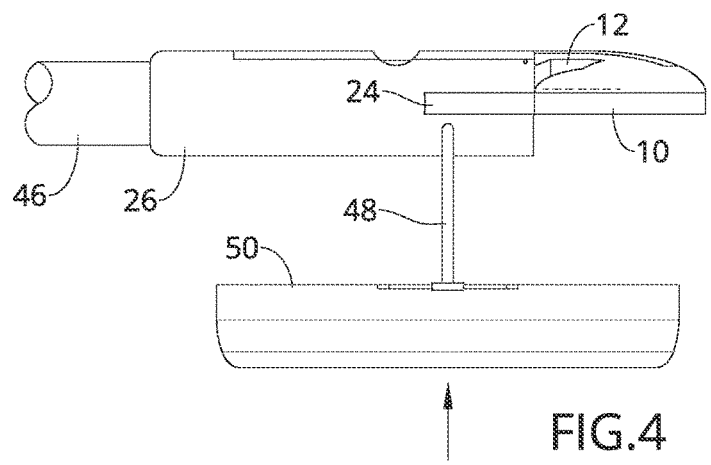
FIG. 4 is a side view of one embodiment of the present disclosure.
Figure 5:
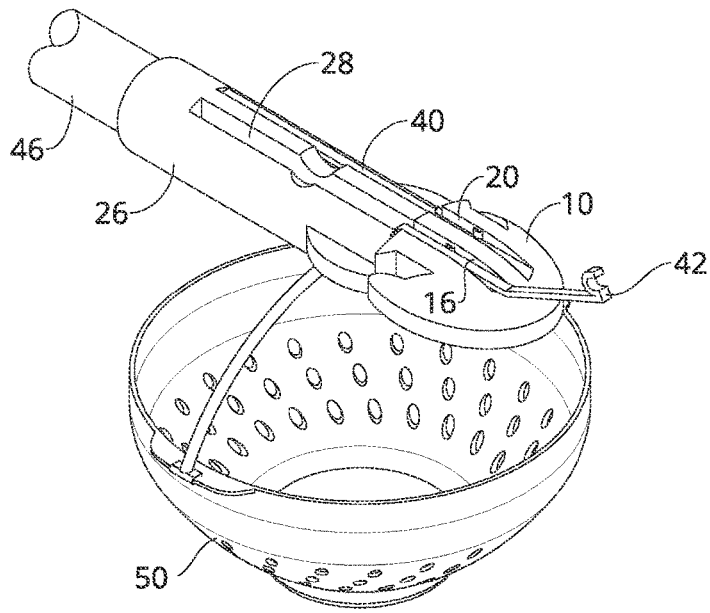
FIG. 5 is a perspective view of one embodiment of the present disclosure.
Figure 6:
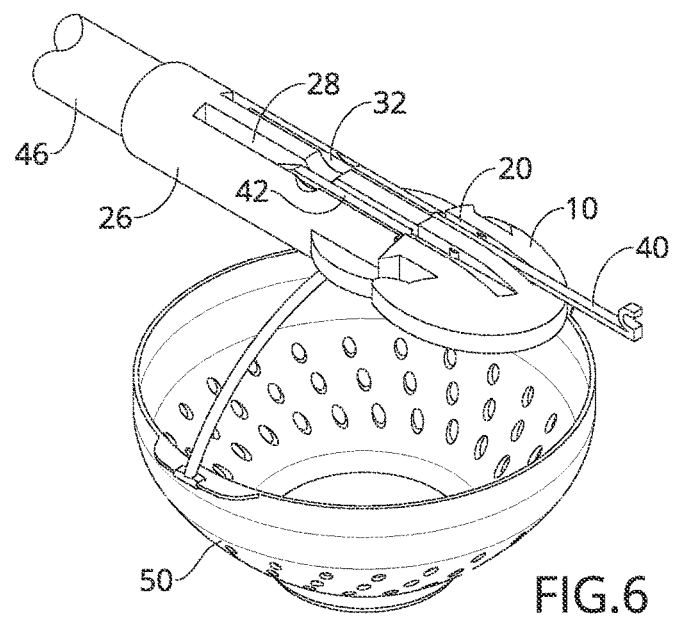
FIG. 6 is a perspective view of one embodiment of the present disclosure.
Figure 7:
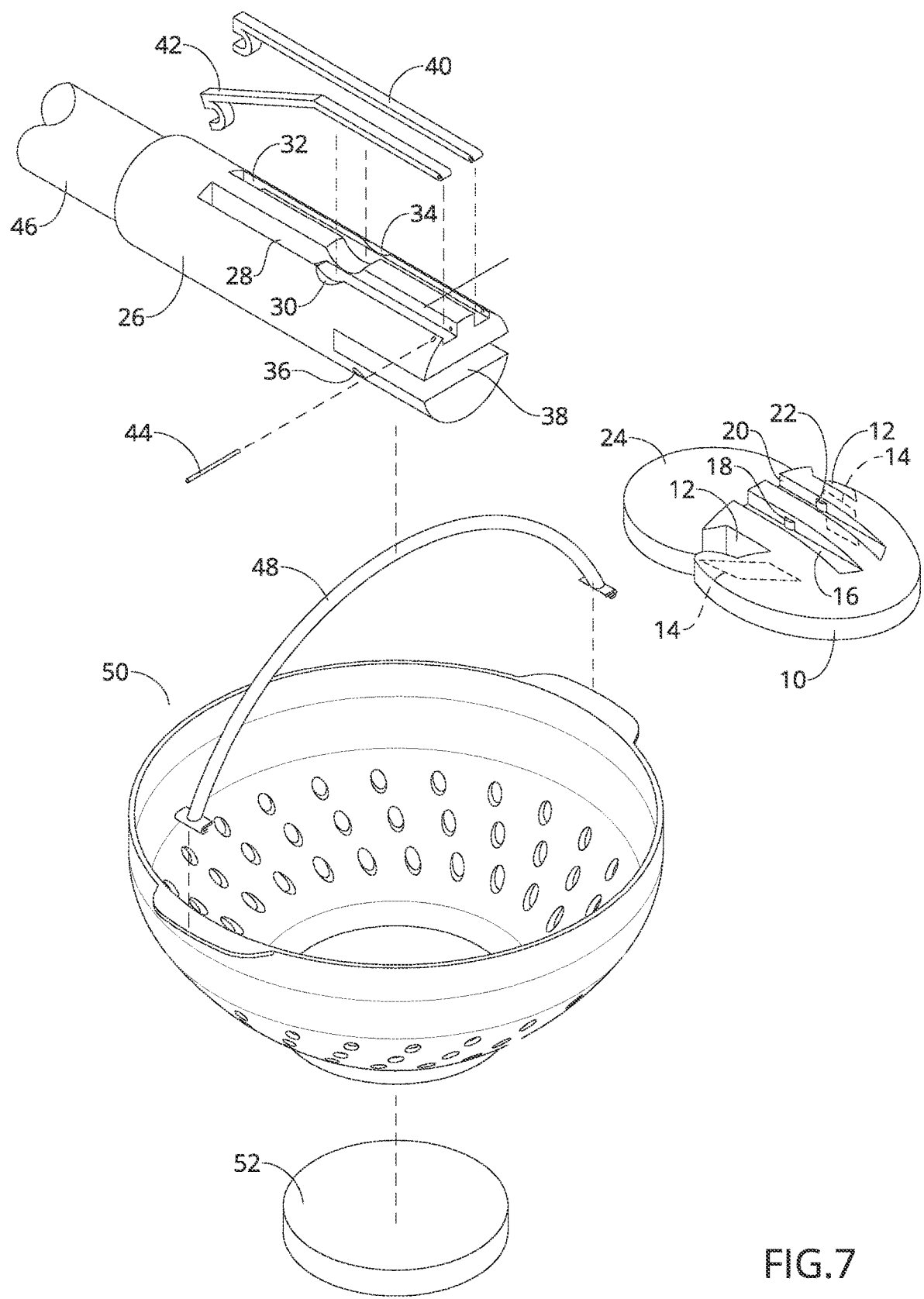
FIG. 7 is an exploded view of one embodiment of the present disclosure.
Figure 8:
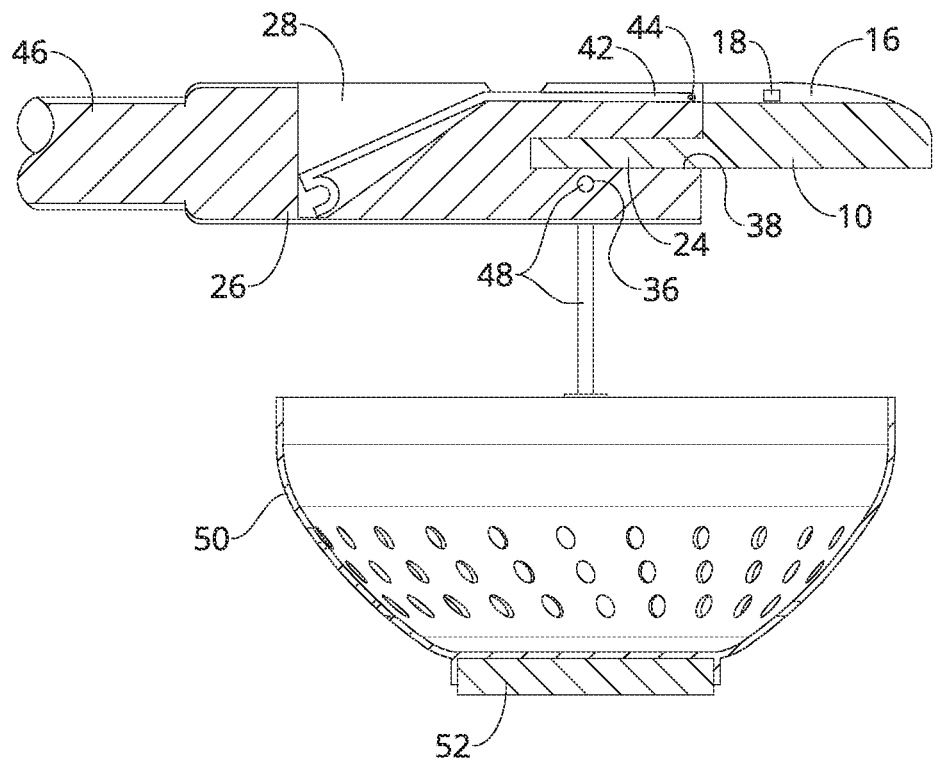
FIG. 8 is a section view of one embodiment of the present disclosure, taken along line 8-8 in FIG. 2.
Figure 9:
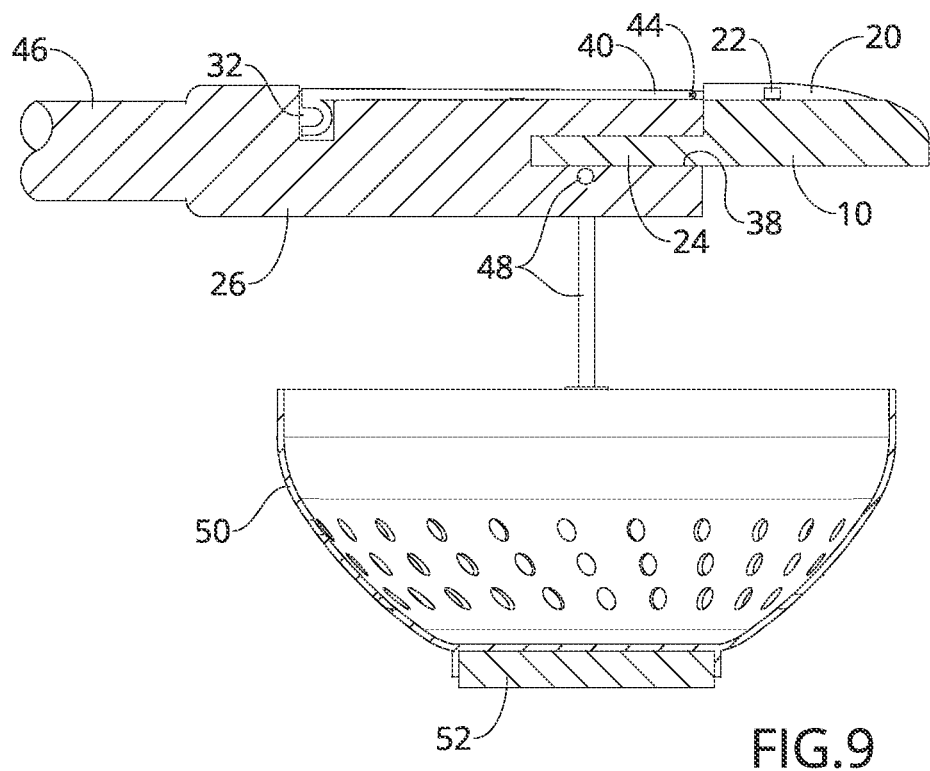
FIG. 9 is a section view of one embodiment of the present disclosure, taken along line 9-9 in FIG. 2.

More specifically, and as shown in the Figures, the elongate handle 46 may comprise an elongate rod. The housing 26 may comprise a post with a first end configured to fit onto the distal end of the elongate handle 46. As shown in FIG. 7, the second end of the post may comprise a blade assembly slot 38 extending therein wherein the blade assembly slot 38 may be configured to accommodate insertion of a portion of the blade assembly therein. As shown in the Figures, the blade assembly slot 38 may be oriented substantially parallel with an elongate length of the housing 26. If the hosing is being held such that the blade assembly slot 38 is oriented substantially parallel with respect to the ground, a top surface of the housing 26 (i.e., the surface furthest from a ground surface) may comprise a pair of substantially parallel channels extending therein, wherein the parallel channels extend from the second end of the post to a portion of the post proximate to the first end thereof. Each of the channels may be a storage slot for a respective pusher bar, wherein each of the respective pusher bars is pivotably mounted within the respective slot such that the pusher may move from a first, stored position within the slot to a second, extended position, wherein the pusher bar extends from the slot at the second end of the housing 26. More specifically, a first channel of the pair of parallel channels may be a bent pusher storage slot 28 sized to accommodate storage of a bent pusher bar 42 therein, while a second channel of the pair of parallel channels may be a straight pusher storage slot 32 sized to accommodate storage of a straight pusher bar 40 therein. At a central location along the edge of each slot may be positioned a rounded notch, each of which may function as a finger nick. More specifically, an outer edge of the bent pusher storage slot 28 may comprise a bent pusher finger nick 30, and an outer edge of the straight pusher storage slot 32 may comprise a straight pusher finger nick 34.

As mentioned above, each of the pusher bars may be pivotably mounted to an open end of the respective channel at the second end of the housing 26. More specifically, and as shown in the Figures, a pivot pin 44 may extend through the second end of the housing and each channel and also through a proximate end of each of the pusher bars, such that the pusher bars are configured to pivot about the pivot pin 44 to be stored within or extend from the respective channel.

In embodiments, the pusher bars may each comprise an elongate member with a hooked distal end. For example, the straight pusher bar 40 may comprise a substantially planar and elongate bar member, wherein the distal end of the elongate bar member comprises a hook, such as a substantially U-shaped hook extending therefrom. The bent pusher bar 42 may comprise an elongate member with a bend or angle therein. The bend may be substantially centrally located along a length of the bar 42, wherein when the bent pusher bar 42 is in its stored configuration, the distal end of the bent pusher bar 42 may be angled downward toward the middle of the housing 26. Similar to the straight pusher bar 40, the bent pusher bar 42 may comprise a hook, such as a substantially U-shaped hook, attached to a distal end thereof. During use, the pushers may work together, with one pusher pushing the line away while the second pusher dislodges the stuck tackle.

The housing 26 may further comprise a basket handle orifice 36 extending through a bottom portion thereof (wherein a bottom portion of the housing 26 is a portion of the housing on an opposite side of the blade assembly slot 38 as the parallel channels. As shown, the basket handle orifice 36 may be substantially circular in cross-section and may be sized to accommodate insertion of a basket handle 48 extending therethrough, wherein the basket handle 48 may freely rotate within the basket handle orifice 36. In embodiments, when the basket 50 is level and/or angled at about 45°, the tackle may land within the bottom of the basket 50 during use thereof.

As shown in the Figures, the basket 50 may comprise a collapsible bowl-like container with a plurality of orifices or openings extending therethrough and a basket handle 48 extending upward from an outer rim thereof. The basket handle 48 may be a bent rod that extends across the diameter (or width) of the basket 50. While it is not particularly limited, when collapsible, the basket 50 may collapse in a manner similar to conventional collapsible strainers. In some embodiments, the basket 50 may further comprise a magnet 52 attached to an outer, bottom surface thereof.

As mentioned above, the device comprises a blade assembly attached to the housing 26. More specifically, the blade assembly may comprise a rear plate 24 configured to be secured within the blade assembly slot 38 on the housing and a head 10 extending from a forward edge of the rear plate 24.

As shown, the head 10 may have a curved forward edge (i.e., outer edge distal from the rear plate 24). The rear edge of the head 10 may be attached to the rear plate 24. A pair of curved arms may extend outward from side edges of the head and back toward the rear plate. An inner surface of each hooked arm may include a blade attached thereto, wherein the opening defined by each curved arm may be a line slot 12. A top surface of the head 10 may comprise a pair of substantially parallel head channels extending therein, wherein the head channels are configured to align with the channels in the housing 26 when the rear plate 24 is secured within the blade assembly slot 38. A first of the parallel head channels may be a bent pusher head slot 16, and a second of the parallel head channels may be a straight pusher head slot 20. Each of the head channels may comprise a retaining nub 18, 22 extending from an inner wall thereof, wherein each of the retaining nubs 18, 22 is configured to help secure the respective pusher bar within the respective head channel when the pusher bar is extended, as shown, for example, in FIG. 6.

The device of the present disclosure may be made of any suitable and desired materials and, in some embodiments, may be made out of mostly plastic, but for the blades, which may be made out of conventional materials used to create razor blades.

Figure 10:
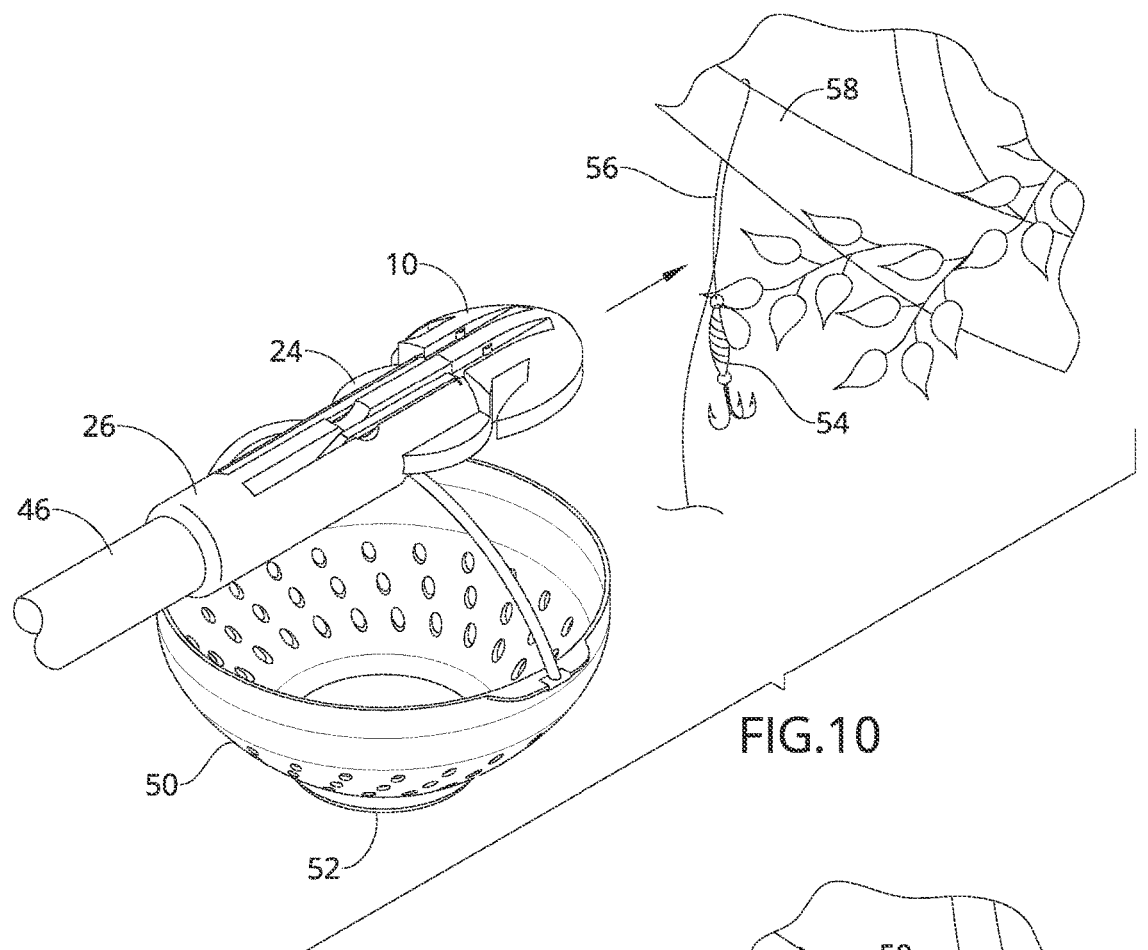
FIG. 10 is a perspective view of one embodiment of the present disclosure, shown in use.
Figure 11:
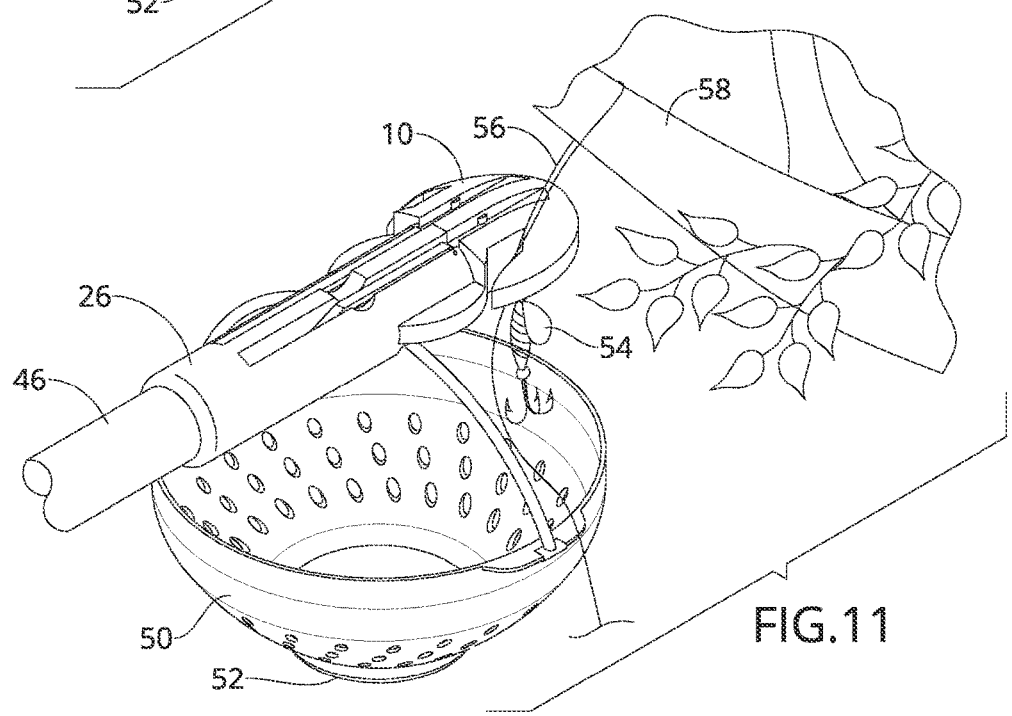
FIG. 11 is a perspective view of one embodiment of the present disclosure, shown in use.

To use the device, a user may first identify a snagged or otherwise caught line 56 and lure 54, such as a line 56 and lure 54 stuck on a branch 58, as shown in FIG. 10. A user may first extend at least one of the pusher bars, if necessary, to push the line or branch 58, as necessary, to provide for a clear approach of the device. The user may then store the pusher bar back in its stored position. Then, the user may position the device and particularly the head 10 toward the stuck line 56 and lure 54. The user may then use the curved arm on the head 10 to grab the line 56, wherein the blade 14 will cut the line 56, resulting in the lure 54 dropping into the basket 50. If the lure 54 misses the basket 50, the user may position the basket 54 such that the magnet 52 is close enough to the lure 54 to magnetically attach to the lure 54. As such, the device may be used to catch lures or to retrieve lures that have fallen.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A device for retrieving caught, stuck, or snagged fishing tackle, the device comprising:
   a housing configured to mount to a handle;
   a blade assembly attached to the housing, the blade assembly comprising a head with a pair of curved arms; and
   a basket attached to and hanging from the housing, the basket including a handle configured to freely rotate within an orifice in the housing.

2. The device of claim 1, wherein:
   the basket comprises a collapsible basket with a plurality of orifices extending therefrom; and
   the handle is a rod-like handle attached to a rim of the basket, the rod-like handle extending across a width of the basket.

3. The device of claim 2, further comprising an elongate handle to which the housing is mounted, the elongate handle comprising a rod-like member.

4. The device of claim 3, wherein the housing comprises a post comprising:
- a first end configured to fit onto a distal end of the elongate handle;
- a second end comprising a blade assembly slot extending therein, the blade assembly slot sized to accommodate insertion of a portion of the blade assembly therein.

5. The device of claim 4, further comprising a pair of pusher bars attached to the housing, wherein:
- a top surface of the housing comprises a pair of substantially parallel channels extending therein, the pair of substantially parallel channels each extending from the second end of the post to a portion of the post proximate to the first end thereof;
- each channel of the pair of substantially parallel channels defines a storage slot for a respective pusher bar of the pair of pusher bars; and
- each respective pusher bar or the pair of pusher bars in pivotably mounted within the respective storage slot such that the pusher is configured to pivot from a first, stored position within the respective storage slot to a second, extended position.

6. The device of claim 5, wherein:
the head comprises:
- a curved forward edge; and
- the pair of curved arms extending outward and backward from side edges of the head.

7. The device of claim 6, wherein the head comprises a top surface with a pair of substantially parallel head channels extending therein, the pair of substantially parallel head channels configured to align with the pair of channels in the housing when the rear plate is secured within the blade assembly slot.

8. The device of claim 4, wherein the pair of pusher bars comprises a straight pusher bar with a hooked end and a bent pusher bar with a hooked end.

9. The device of claim 8, wherein the blade assembly comprises a rear plate configured to be secured within the blade assembly slot on the housing and the head extending from a forward edge of the rear plate.

10. The device of claim 1, wherein an inner surface of each curved arm of the pair of curved arms includes a blade attached thereto.

* * * * *